United States Patent
Tchertkov et al.

(10) Patent No.: US 7,548,318 B2
(45) Date of Patent: Jun. 16, 2009

(54) DITHERING MECHANISM FOR ELIMINATING ZERO-RATE BIAS IN A GYROSCOPE

(75) Inventors: Igor Leonidovich Tchertkov, Concord, CA (US); Salisbury Edward Henry Aston, Concord, CA (US); Richard John August, Concord, CA (US); Randall Jaffe, Clayton, CA (US)

(73) Assignee: Custom Sensors & Technologies, Inc., Moorpark, CA (US)

( * ) Notice: Subject to any disclaimer, the term of this patent is extended or adjusted under 35 U.S.C. 154(b) by 84 days.

(21) Appl. No.: 11/734,983

(22) Filed: Apr. 13, 2007

(65) Prior Publication Data

US 2008/0252175 A1    Oct. 16, 2008

(51) Int. Cl.
    G01C 19/70    (2006.01)
    G01P 3/00     (2006.01)
(52) U.S. Cl. .................................. 356/476; 73/504.01
(58) Field of Classification Search .................. 356/459, 356/472, 476; 310/331; 73/504.01, 504.04
See application file for complete search history.

(56) References Cited

U.S. PATENT DOCUMENTS

| | | | |
|---|---|---|---|
| 4,115,004 A * | 9/1978 | Hutchings et al. | 356/476 |
| 4,349,183 A * | 9/1982 | Wirt et al. | 267/160 |
| 4,445,779 A | 5/1984 | Johnson | |
| 4,779,985 A * | 10/1988 | Wirt | 356/476 |
| 4,981,359 A | 1/1991 | Tazartes et al. | |
| 5,044,749 A * | 9/1991 | Califano | 356/460 |
| 5,329,355 A | 7/1994 | Killpatrick | |
| 7,066,004 B1 | 6/2006 | Kohler | |
| 2006/0196269 A1 | 9/2006 | Jaffe | |

FOREIGN PATENT DOCUMENTS

| | | |
|---|---|---|
| EP | 0348087 A2 | 12/1989 |
| EP | 0411824 A2 | 2/1991 |
| WO | 94/14076 A1 | 6/1994 |

OTHER PUBLICATIONS

Fargas-Marques, A. et al, "On Electrostatic Actuation Beyond Snapping Condition", Oct. 30-Nov. 3, 2005, pp. 600-603, IEEE.

* cited by examiner

Primary Examiner—Michael A Lyons
(74) Attorney, Agent, or Firm—Edward S. Wright

(57) ABSTRACT

Dithering mechanism and method for eliminating the effects of zero-rate bias in a rate sensor or gyroscope. Both continuously moving and indexing embodiments are disclosed. The mechanism includes a first part mounted in a fixed position centered about a dither axis perpendicular to the input axis of the gyroscope, a second part disposed coaxially of the first part and affixed to the sensing element of the gyroscope, and a plurality of piezoelectrically driven quartz flexure beams extending radially between the first and second parts for dithering the second part about the dither axis. In some embodiments, the dithering mechanism is formed separately from and affixed to the sensing element of the gyroscope, and in others it is formed integrally with the sensing element. In the indexing embodiments, radial arms and fixed stops limit movement of the mechanism between two fixed positions, and drive signals and holding potentials are applied alternately to dither the mechanism between the two positions and to hold it alternately in those positions during successive data acquisition periods.

22 Claims, 4 Drawing Sheets

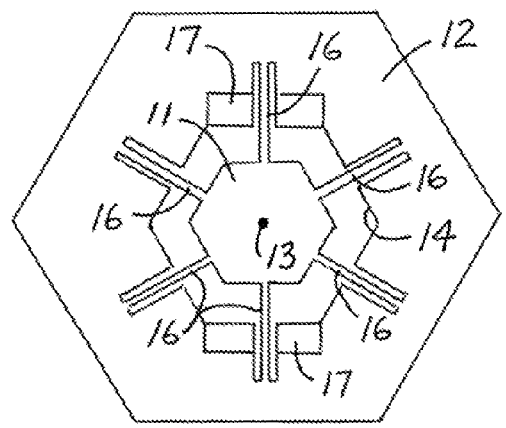
Fig. 1
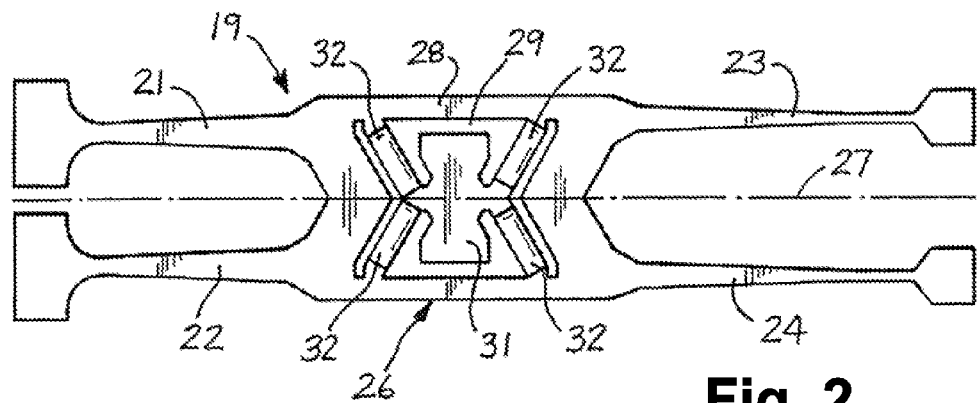
Fig. 2
Fig. 3
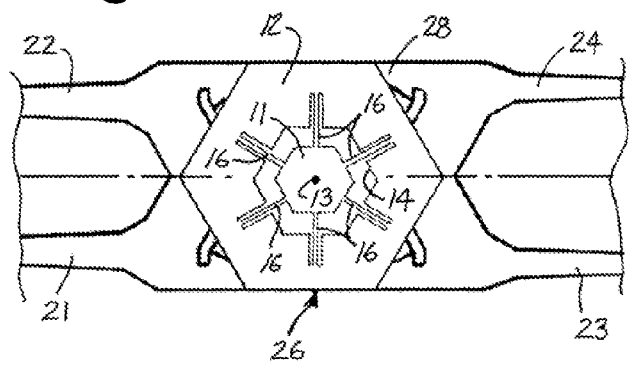
Fig. 4
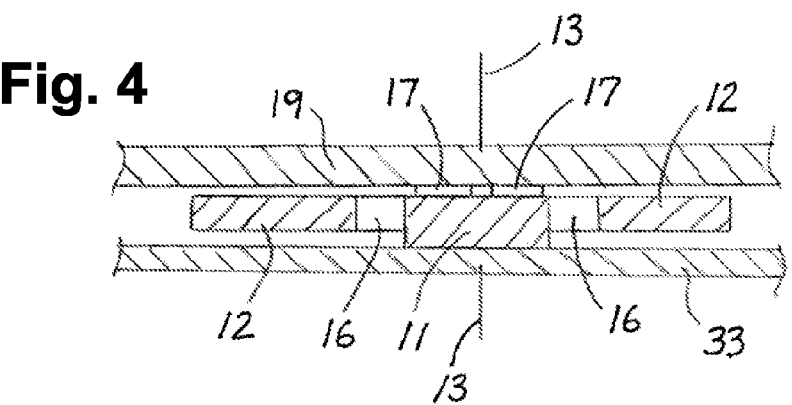

Fig. 12
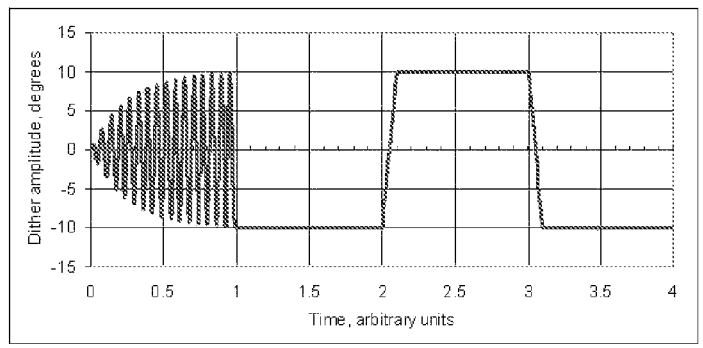
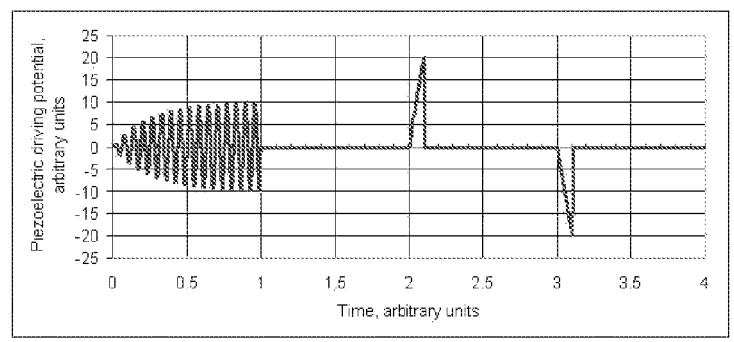
Fig. 13
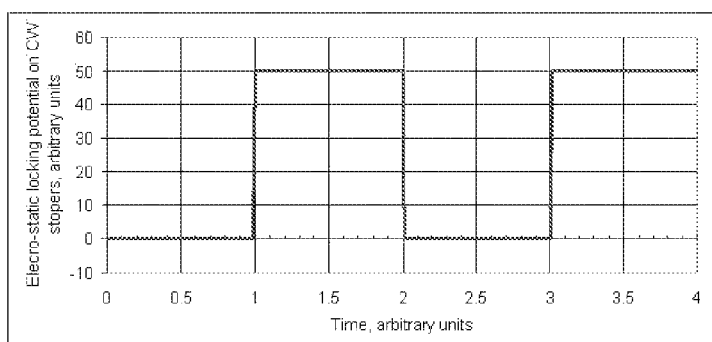
Fig. 14
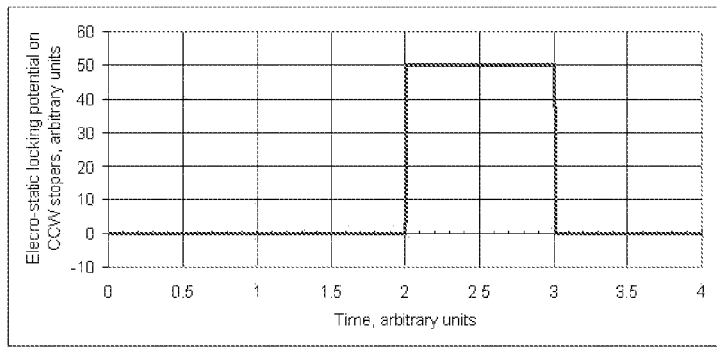
Fig. 15

DITHERING MECHANISM FOR ELIMINATING ZERO-RATE BIAS IN A GYROSCOPE

BACKGROUND OF THE INVENTION

1. Field of Invention

This invention pertains generally to angular rate sensors or gyroscopes and, more particularly, to a dithering mechanism for eliminating the effects of zero-rate bias in a rate sensor or gyroscope.

2. Related Art

Angular rate sensors or gyroscopes exhibit a non-zero output in the absence of rotation about the input axis. This non-zero output is called bias, and it can cause significant errors in inertial measurements. At the time of manufacture, the bias for each individual gyroscope can be measured and subtracted from the output to set the zero-rate output to zero. However, bias is not fixed in time, and it tends to drift with changes such as temperature and aging of the materials employed in the sensor. This may require periodic re-zeroing of a sensor in the field.

Bias cancellation, or "washout", mechanisms are employed in order to reduce or eliminate the effects of biases that slowly change with time in an unpredictable manner. By dithering the input, or sensitive, axis of a gyroscope, such mechanisms are able to provide automatic adjustment for changes in zero-rate output due to temperature, time or other errors.

Dithering of gyroscopes is well known in the art. A ring laser gyroscope, for example, is dithered around its sensitive axis for the purpose of avoiding frequency lock-in. However, rotating a sensor about its input axis is undesirable because it provides an angular rate input other than the one to be detected.

Dithering the input axis of a gyroscope about an axis perpendicular to the input axis to cancel bias is also well known. Continuously rotating the input axis to eliminate the effects of bias is known as carouseling, and periodically moving the input axis between discrete locations to remove or cancel bias is known as indexing.

OBJECTS AND SUMMARY OF THE INVENTION

It is in general an object of the invention to provide a new and improved dithering mechanism for eliminating the effects of zero-rate bias in a gyroscope.

Another object of the invention is to provide a dithering mechanism of the above character which is fabricated by micromachining techniques.

These and other objects are achieved in accordance with the invention by providing a dithering mechanism comprising: a first part mounted in a fixed position centered about a dither axis perpendicular to the input axis of a gyroscope, a second part disposed coaxially of the first part and affixed to the sensing element of the gyroscope, and a plurality of piezoelectrically driven flexure beams extending radially between the first and second parts for dithering the second part about the dither axis.

In some embodiments, the dithering mechanism is formed separately from and affixed to the sensing element of the gyroscope, and in others it is formed integrally with the sensing element.

BRIEF DESCRIPTION OF THE DRAWINGS

FIG. 1 is a top plan view of one embodiment of a dithering mechanism incorporating the invention.

FIG. 2 is a top plan view of one embodiment of a tuning fork mounted on the dithering mechanism of FIG. 1.

FIG. 3 is a fragmentary bottom plan view of the embodiment of FIG. 2.

FIG. 4 is a vertical sectional view of the embodiment of FIG. 2.

FIG. 12 is a graphical representation of the dithering motion of the tuning fork in the embodiment of FIG. 8.

FIG. 13 is a graphical representation of the drive voltage applied to the piezoelectrically driven quartz flexure beams of the dithering mechanism in the embodiment of FIG. 8.

FIGS. 14 and 15 are graphical representations of the electrostatic holding potentials applied respectively to the clockwise and counter-clockwise stops of the dithering mechanism in the embodiment of FIG. 8.

DETAILED DESCRIPTION

Figure 5:
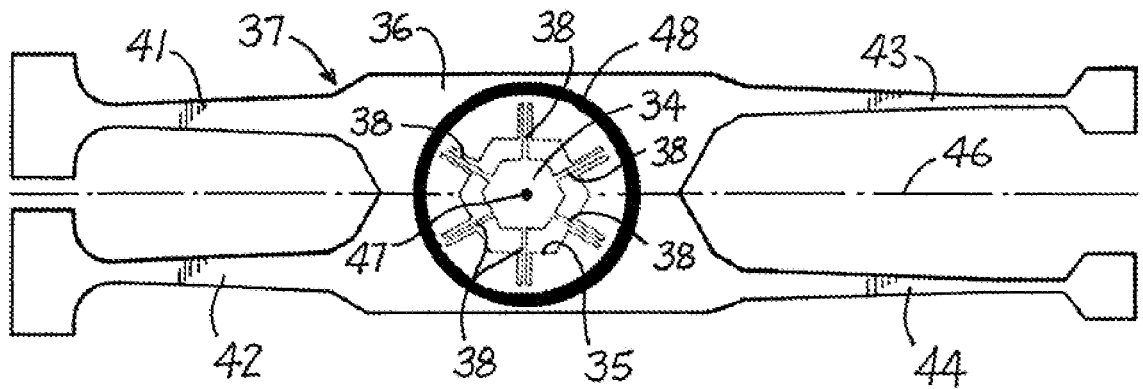
FIG. 5 is a top plan view of another embodiment of a tuning fork with a dithering mechanism incorporating the invention.
Figure 6:
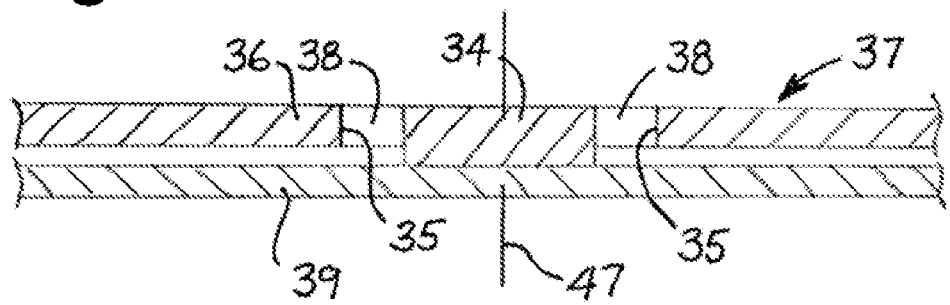
FIG. 6 is a vertical sectional view of the embodiment of FIG. 5.

As illustrated in FIG. 1, the dithering mechanism includes a mounting post 11 and an outer ring 12 which is disposed coaxially about the post. Both the post and the ring are hexagonal in shape and centered about a dither axis 13, with the post in a hexagonal opening 14 in the ring. The ring is mounted to the post by radially extending flexure beams 16, and mounting pads 17 are provided on the upper side of the ring for attachment to the sensing element of a gyroscope.

The dithering mechanism is formed as a unitary structure of a piezoelectric material such as crystalline quartz and fabricated by micromachining techniques such as photo lithography, etching and surface deposition. The flexure beams are driven as piezoelectric actuators by signals applied to electrodes (not shown) mounted on the beams to dither the ring through a small angle, typically on the order of 10 degrees. In order to maintain a stable angle of dither, the drive signals preferably have an amplitude which varies constantly and continuously such as that of a pure sinusoidal waveform. A suitable sinusoidal drive signal can, for example, have an amplitude on the order of 100 volts or less and a frequency on the order of 10 to 100 Hz.

Thus, the flexures function as piezoelectric actuators as well as suspension beams. In addition, electrical conductors or traces can be mounted on them for carrying the drive signals to the actuators and drive and pick-up signals for the sensing element dithered by the mechanism.

The hexagonal structure of the mechanism is particularly compatible with the trigonal crystal symmetry of quartz, and the six flexural members can be aligned along axes which provide optimal piezoelectric coupling for actuating the dithering motion, e.g., along either the crystallographic x-axis or the crystallographic y-axis of the quartz.

If desired, the mechanism can be fabricated of a material other than quartz. Other suitable materials include other piezoelectric crystals such as lithium niobate or lithium tantalate, piezoelectric ceramics such as lead zirconium titanate (PZT), and thin-film piezoelectric coatings such as PZT film on single-crystal silicon.

In FIGS. 2-4, the dithering mechanism is illustrated in conjunction with a sensing element in the form of a tuning fork 19. The tuning fork has a pair of drive tines 21, 22 and a pair of pickup tines 23, 24 which extend in opposite directions from a central body or base 26 and are disposed symmetrically about the input axis 27 of the device. The body includes a frame 28 which surrounds a central opening 29, with a mounting pad or base 31 within the opening connected to the frame by relatively thin bridges 32. Like the dithering mechanism, the tuning fork is formed as a unitary structure of a piezoelectric material such as quartz. Drive and pickup electrodes (not shown) are mounted on the tines in a conventional manner.

The tuning fork is mounted on the dithering mechanism, with the base 31 of the tuning fork resting on mounting pads 17 and the lower end of post 11 affixed to the base 33 of the package in which the gyroscope is housed. Base 31 is bonded to mounting pads 17 and post 11 is affixed to the package by suitable means such as solder, epoxy or other adhesive. Dither axis 13 is perpendicular to the input or sensitive axis 27, of the gyroscope, and dithering of ring 11 is transferred to the base of the tuning fork so that the input or sensitive axis of the tuning fork is dithered about the dither axis.

In the embodiment of FIG. 5, the dithering mechanism is formed integrally with the tuning fork. In this embodiment, the tuning fork and the dithering mechanism are formed as a unitary structure of crystalline quartz, with a hexagonal mounting post 34 disposed in a hexagonal opening 35 in the central body 36 of the tuning fork. The tuning fork 37 is suspended from the mounting post by flexure beams 38 which are similar to flexure beams 16. The post extends below the under side of the tuning fork and is affixed to the package 39 in which the gyroscope is housed.

As in the embodiment of FIG. 2, the tuning fork has drive tines 41, 42 and pickup tines 43, 44 which extend in opposite directions from central body 36 and are disposed symmetrically about an input axis 46. When driven piezoelectrically, flexure beams 38 cause the tuning fork to dither about the axis 47 of mounting post 34 which is perpendicular to input axis 46.

In this embodiment, the flexures once again function both as piezoelectric actuators and as suspension beams, and electrical conductors or traces can be mounted on them for carrying the drive signals to the actuators as well as for carrying drive and pick-up signals to and from the electrodes on the tines of the tuning fork.

Means is provided for monitoring the instantaneous rotational position of the tuning fork relative to the base on which it is mounted, and in the embodiment illustrated, the scale 48 of an optical encoder is applied to the upper surface of the tuning fork and disposed concentrically of dither axis 47. Alternatively, another suitable type of encoder, such as a capacitive encoder, can be utilized, if desired.

Figure 7:
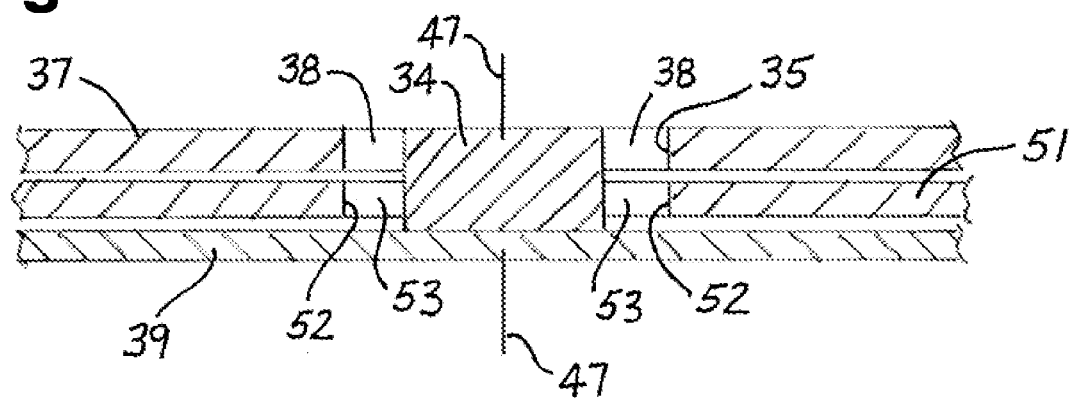
FIG. 7 is a vertical sectional view of another embodiment of a tuning fork with a dithering mechanism incorporating the invention.

The embodiment of FIG. 7 is generally similar to the embodiment of FIG. 5, and like reference numerals designate corresponding elements in the two embodiments. In this embodiment, however, a second tuning fork 51 is positioned beneath tuning fork 37. Tuning fork 51 is identical to tuning fork 37 and is stacked congruently with it, with mounting post 34 extending through a central opening 52 and flexure beams 53 mounting the fork to the post. The flexure beams for the two tuning forks are driven out of phase so that the tuning forks dither in an anti-phase manner about dither axis 47. With a common dither frequency and with equal and opposite angular displacements, the net angular momentum is zero, and little or no vibration is coupled to the package. If desired, a dummy mass can be utilized instead of the second tuning fork and still provide a balancing of angular momentum within the system.

Figure 8:
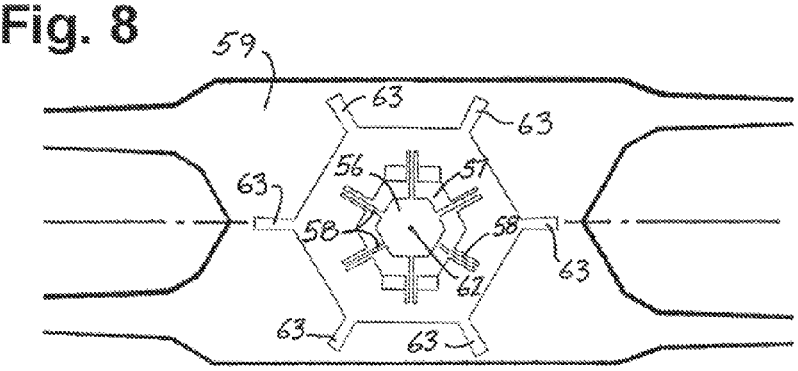
FIG. 8 is a fragmentary bottom plan view of another embodiment of a tuning fork with a dithering mechanism incorporating the invention.
Figure 9:
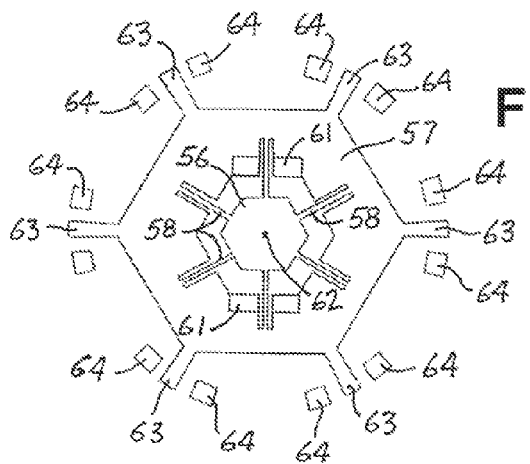
FIG. 9 is a top plan view of the dithering mechanism in the embodiment of FIG. 8.
Figure 10:
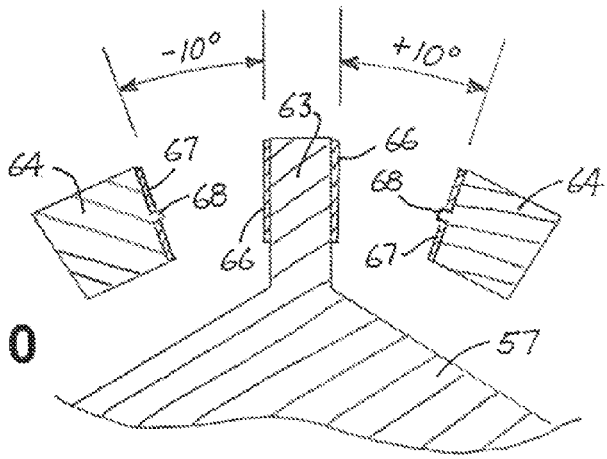
FIG. 10 is an enlarged, fragmentary, horizontal sectional view of the dithering mechanism in the embodiment of FIG. 9.
Figure 11:
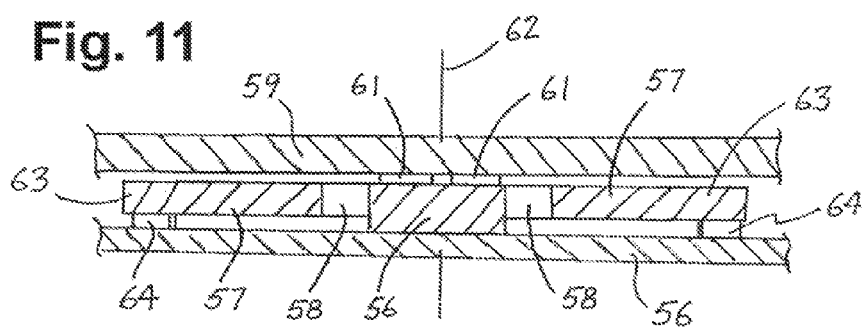
FIG. 11 is a vertical sectional view of the embodiment of FIG. 8.

With the embodiments described thus far, the tuning fork swings continuously back and forth through a small angle. In the embodiment of FIG. 8, however, the tuning fork is periodically swung between and locked in two predetermined positions for data acquisition. As in the embodiment of FIG. 1, the dithering mechanism is formed as a unitary structure of a piezoelectric material such as crystalline quartz with a substrate 54, a mounting post 56 affixed to the substrate, an outer ring 57 disposed coaxially of the post, and flexure beams 58 extending radially between the post and the ring. The post is mounted in a fixed position, and a tuning fork 59 is mounted on the ring by mounting pads 61 for movement about the axis 62 of the post. Post 56 and ring 57 are hexagonal in shape, and flexure beams 58 are driven as piezoelectric actuators by signals applied to electrodes (not shown) on the beams.

Arms 63 extend out in radial directions from the corners or vertices of the ring 57, and stops 64 are mounted in fixed positions on opposite sides of the arms to limit rotation of the ring. The confronting surfaces of the arms and the stops intercept a small angle, typically about 10 degrees, when the ring is in a neutral position.

Electrodes 66, 67 are mounted on the confronting faces of arms 63 and stops 64 and energized to produce electrostatic forces for locking the ring in the two extreme positions with the arms abutting against the stops. Small protrusions 68 on the stops extend through openings in electrodes 67 and abut against electrodes 66 to prevent the electrodes from contacting each other and shorting out. The length of the protrusions determines the width of the gaps between the electrodes when the mechanism is in the two locked positions, and with current photo lithography technology, the protrusions can have a length on the order of 2 microns. Since the thickness of the electrodes is negligible compared to that dimension, the width of the gaps is substantially equal to the length of the protrusions.

The movement of the dithering mechanism and the tuning fork mounted thereon is illustrated in FIG. 12, where the rotational position of the mechanism is shown as a function of time. This figure shows a start-up phase which occurs during the interval between 0 and 1 unit of time, a first data acquisition phase during the interval between 1 and 2 units of time, a second data acquisition phase during the interval between 2.1 and 3 units of time, and a third data acquisition phase during the interval between 3.1 and 4 units of time.

Because of the relatively high Q of the dither-gyro system (Q>1,000) it takes time to pump enough energy into oscillatory system in order to reach the desired amplitude of oscillation. This process takes place during the start-up phase and manifests itself as a rise of amplitude of oscillation.

As illustrated in FIGS. 12-14, when the amplitude of the oscillation reaches the distance between the stops, the drive voltage is removed from piezoelectric actuators 58, and an electro-static locking potential is applied to the electrodes 66 on the clockwise faces of arms 63 and to the electrodes 67 on the counter-clockwise faces of stops 64. The locking potential is maintained during the first data acquisition interval, and the mechanism and tuning fork are thus held in the clockwise position during that interval.

At the end of the first data acquisition phase, the first locking potential is removed, and energy stored in the flexure beams or actuators swings the dithering mechanism back in the counter-clockwise direction. A small amount of mechanical energy is lost in the system, and a drive pulse is applied to the piezoelectric actuators, as shown in FIG. 13, to ensure that the mechanism swings to the full counter-clockwise position. When that position is reached, a second holding potential is applied to the electrodes on the counter-clockwise faces of arms 63 and to the electrodes on the clockwise faces of stops 64, as shown in FIG. 15, to lock the mechanism in the counter-clockwise position. This locking potential is maintained during throughout the second data acquisition interval, and the mechanism and tuning fork are thus held in the counter-clockwise position during that interval.

At the end of the second data acquisition phase, the second locking potential is removed, and the dithering mechanism swings back in the clockwise direction. Another drive pulse is applied to the piezoelectric actuators to ensure that the mechanism swings to the full clockwise position. When that position is reached, the first holding potential is once again applied to the electrodes on the counter-clockwise faces of arms 63 and to the electrodes on the clockwise faces of stops 64 to lock the mechanism in the counter-clockwise position throughout the third data acquisition interval.

This process continues, with the tuning fork being held first in one data acquisition position and then in the other.

For a given mechanism, the required electrostatic holding potential can be determined from the following equation for balancing the electrostatic attraction force (on the left) and the elastic restoring force (on the right):

$$\frac{\varepsilon_0 A V^2}{2g^2} = kg,$$

where $\varepsilon_0$ is the dielectric constant, A is the area of the electrodes, V is the electrostatic locking potential, g is the gap in the locked position, and k is the elastic constant of the flexure beams.

Thus, for example, with a crystalline quartz structure, flexure beams having a thickness on the order of 50 microns and a length on the order of 19 mm, and electrodes having dimensions on the order of 625 microns×2 mm, and gaps of approximately 2 microns, the holding potential required is on the order of 0.6 volt.

The advantage of piezoelectric actuation, dynamic switching, and electrostatic locking is readily apparent when the relatively low 0.6 V holding potential is compared with the actuating potential that would be required for a dithering mechanism of similar dimensions without the piezoelectric actuators and dynamic switching. In such a mechanism, the initial gaps between arms 63 and stops 64 (the gaps when the arms are in their neutral positions between the stops) are on the order of 2.5 mm. With electrostatic pull-in occurring when the gaps are about two-thirds of the initial gaps, i.e. about 1.7 mm, the potential required to draw the arms to the stops would be on the order of 13.3 kV, a highly impractical potential compared to 0.6 volt.

Although the invention has been disclosed in connection with a dithering mechanism which is particularly suitable for zero-rate bias cancellation, other applications are possible as well. By applying a static voltage to the mechanism, the input axis of the gyroscope can be varied to provide a fine adjustment for pointing the gyroscope. This may be done to achieve a more accurate position of the input axis than can be achieved by just the mechanical assembly of the device. In addition, the orientation of the input axis can be varied to adjust for variations in temperature or mechanical drift over time, or it can be adjusted to new positions as required by the needs of the system in which it is used.

It is apparent from the foregoing that a new and improved dithering mechanism and method have been provided. While only certain presently preferred embodiments have been described in detail, as will be apparent to those familiar with the art, certain changes and modifications can be made without departing from the scope of the invention as defined by the following claims.

The invention claimed is:

1. A dithering mechanism for a gyroscope having a sensing element for monitoring rotation about an input axis, comprising: a first part mounted in a fixed position centered about a dither axis perpendicular to the input axis, a second part disposed coaxially of the first part and affixed to the sensing element, and a plurality of piezoelectrically driven flexure beams extending radially between the first and second parts for dithering the second part about the dither axis.

2. The dithering mechanism of claim 1 wherein the first part, the second part and the flexure beams are formed as a unitary structure of crystalline quartz.

3. The dithering mechanism of claim 2 wherein at least one of the flexure beams is aligned along a crystallographic axis of the quartz.

4. The dithering mechanism of claim 1 wherein the first part is disposed coaxially within the second part.

5. The dithering mechanism of claim 1 wherein the first part is a hexagonal post, the second part is a hexagonal ring, and six flexure beams extend between the post and the ring.

6. The dithering mechanism of claim 1 wherein the sensing element is fabricated of quartz, and the second part is an integral part of the sensing element.

7. The dithering mechanism of claim 1 wherein the flexure beams are fabricated of a material selected from the group consisting of quartz, other piezoelectric crystals, piezoelectric ceramics, and thin-film piezoelectric coatings.

8. The dithering mechanism of claim 1 including a balancing element which is similar to and stacked congruently with the sensing element, with the first part also extending through an opening in the balancing element, and piezoelectrically driven flexure beams extending between the first part and the balancing element for dithering the balancing element about the dither axis in an anti-phase manner relative to the sensing element.

9. The dithering mechanism of claim 8 wherein the balancing element is also a sensing element.

10. A dithering mechanism for a gyroscope having a sensing element with elongated tines extending from a central body in a direction parallel to an input axis, comprising: a post disposed within an opening in the central body, and a plurality of piezoelectrically driven flexure beams extending radially between the post and the body for dithering the sensing element about a dither axis perpendicular to the input axis.

11. The dithering mechanism of claim 10 wherein the sensing element, the post and the flexure beams are formed as a unitary structure of crystalline quartz.

12. The dithering mechanism of claim 11 wherein at least one of the flexure beams is aligned along a crystallographic axis of the quartz.

13. The dithering mechanism of claim 10 wherein the post and the opening in the body are hexagonal, and six flexure beams extend between the post and the body.

14. The dithering mechanism of claim 10 wherein the flexure beams are fabricated of a material selected from the group consisting of quartz, other piezoelectric crystals, piezoelectric ceramics, and thin-film piezoelectric coatings.

15. The dithering mechanism of claim 10 including a balancing element which is similar to and stacked congruently with the sensing element, with the post also extending through an opening in the balancing element, and piezoelectrically driven flexure beams extending between the post and the balancing element for dithering the balancing element about the dither axis in an anti-phase manner relative to the sensing element.

16. The dithering mechanism of claim 15 wherein the balancing element is also a sensing element.

17. The dithering mechanism of claim 10 including an encoder scale on the sensing element for monitoring the angular position of the input axis about the dither axis.

18. A dithering mechanism for a gyroscope having a sensing element with elongated tines extending from a central body in a direction parallel to an input axis, comprising: a balancing element which is similar to and stacked congruently with the sensing element, a mounting post extending through aligned openings in the central body and in the balancing element, and first and second sets of piezoelectrically driven flexure beams extending radially between the mounting post and respective ones of the body and the balancing element for dithering the sensing element and the balancing element in an anti-phase manner about a dither axis perpendicular to the input axis.

19. The dithering mechanism of claim 18 wherein the sensing element, the balancing element, the post and the flexure beams are formed as a unitary structure of crystalline quartz.

20. The dithering mechanism of claim 19 wherein at least one of the flexure beams is aligned along a crystallographic axis of the quartz.

21. The dithering mechanism of claim 20 wherein the openings and the post are hexagonal in shape, and there are six flexure beams in each of the first and second sets.

22. The dithering mechanism of claim 18 wherein the flexure beams are fabricated of a material selected from the group consisting of quartz, other piezoelectric crystals, piezoelectric ceramics, and thin-film piezoelectric coatings.

* * * * *